(12) United States Patent
Harang

(10) Patent No.: US 11,574,052 B2
(45) Date of Patent: Feb. 7, 2023

(54) METHODS AND APPARATUS FOR USING MACHINE LEARNING TO DETECT POTENTIALLY MALICIOUS OBFUSCATED SCRIPTS

(71) Applicant: Sophos Limited, Abingdon (GB)

(72) Inventor: Richard Harang, Alexandria, VA (US)

(73) Assignee: Sophos Limited, Abingdon (GB)

(*) Notice: Subject to any disclaimer, the term of this patent is extended or adjusted under 35 U.S.C. 154(b) by 942 days.

(21) Appl. No.: 16/263,264

(22) Filed: Jan. 31, 2019

(65) Prior Publication Data

US 2020/0250309 A1    Aug. 6, 2020

(51) Int. Cl.
```
G06F 21/56     (2013.01)
G06F 16/35     (2019.01)
G06K 9/62      (2022.01)
G06N 3/04      (2006.01)
```
(52) U.S. Cl.
CPC .......... G06F 21/563 (2013.01); G06F 16/35 (2019.01); G06K 9/6217 (2013.01); G06N 3/04 (2013.01)

(58) Field of Classification Search
CPC ..... G06F 21/563; G06F 16/35; G06K 9/6217; G06N 3/04
See application file for complete search history.

(56) References Cited

U.S. PATENT DOCUMENTS

| | | | |
|---|---|---|---|
| 7,069,589 B2 | 6/2006 | Schmall et al. | |
| 7,204,152 B2 | 4/2007 | Woodward et al. | |
| 7,219,148 B2 | 5/2007 | Rounthwaite et al. | |
| 7,545,986 B2 | 6/2009 | Bachmann | |
| 7,558,832 B2 | 7/2009 | Rounthwaite et al. | |
| 7,711,663 B2 | 5/2010 | Weng | |
| 7,769,772 B2 | 8/2010 | Weyl et al. | |
| 7,934,103 B2 | 4/2011 | Kidron | |
| 8,458,794 B1 | 6/2013 | Sallam | |
| 8,635,700 B2 | 1/2014 | Richard et al. | |

(Continued)

FOREIGN PATENT DOCUMENTS

| CA | 2799691 C | 9/2014 |
|---|---|---|
| WO | WO 2007/117636 A2 | 10/2007 |

(Continued)

OTHER PUBLICATIONS

Ba, et al., "Layer Normalization." [Online] Retrieved from the Internet https://arxiv.org/pdf/1607.06450.pdf>, Submitted on Jul. 21, 2016, 14 pages.

(Continued)

*Primary Examiner* — Hee K Song
(74) *Attorney, Agent, or Firm* — Cooley LLP

(57) ABSTRACT

In some embodiments, an apparatus includes a memory and a processor. The processor can further be configured to extract a set of scripts from potentially malicious a file. The processor can further be configured to concatenate a representation of each script from the set of scripts with a representation of the remaining scripts from the set of scripts to define a script string. The processor can further be configured to define a feature vector based on the set of n-gram representations of the script string for input of the feature vector to a neural network for output. The processor can further be configured to identify, based on the output from the neural network, a maliciousness classification of the file.

21 Claims, 5 Drawing Sheets

(56) References Cited

U.S. PATENT DOCUMENTS

| | | | |
|---|---|---|---|
| 9,189,730 | B1 | 11/2015 | Coenen et al. |
| 9,404,833 | B2 | 8/2016 | Stadlbauer et al. |
| 9,514,391 | B2 | 12/2016 | Perronnin et al. |
| 9,531,742 | B2 | 12/2016 | Kohout et al. |
| 9,672,358 | B1 | 6/2017 | Long et al. |
| 9,690,938 | B1 | 6/2017 | Saxe et al. |
| 9,721,097 | B1 | 8/2017 | Davis et al. |
| 9,792,492 | B2 | 10/2017 | Soldevila et al. |
| 9,807,113 | B2 | 10/2017 | Yang et al. |
| 9,864,956 | B1 | 1/2018 | Sai |
| 10,015,150 | B2 | 7/2018 | Basin |
| 10,193,902 | B1 | 1/2019 | Caspi |
| 10,521,587 | B1* | 12/2019 | Agranonik .......... G06N 3/0454 |
| 10,635,813 | B2 | 4/2020 | Saxe et al. |
| 10,956,477 | B1* | 3/2021 | Fang .................. G06F 40/30 |
| 11,003,774 | B2 | 5/2021 | Saxe et al. |
| 11,270,205 | B2 | 3/2022 | Harang |
| 2006/0013475 | A1 | 1/2006 | Philomin et al. |
| 2009/0300765 | A1 | 12/2009 | Moskovitch et al. |
| 2013/0067579 | A1 | 3/2013 | Beveridge et al. |
| 2014/0090061 | A1 | 3/2014 | Avasarala et al. |
| 2014/0143869 | A1 | 5/2014 | Pereira et al. |
| 2015/0046850 | A1 | 2/2015 | Kurabayashi et al. |
| 2015/0067853 | A1 | 3/2015 | Amrutkar et al. |
| 2015/0363294 | A1 | 12/2015 | Carback, III et al. |
| 2016/0217368 | A1 | 7/2016 | Ioffe et al. |
| 2016/0253500 | A1* | 9/2016 | Alme ............... G06F 16/2246 726/23 |
| 2017/0046616 | A1 | 2/2017 | Socher et al. |
| 2017/0078317 | A1 | 3/2017 | Gertner et al. |
| 2017/0212829 | A1 | 7/2017 | Bales et al. |
| 2017/0372071 | A1 | 12/2017 | Saxe et al. |
| 2018/0060580 | A1 | 3/2018 | Zhao et al. |
| 2018/0101682 | A1 | 4/2018 | Krukov et al. |
| 2018/0121802 | A1 | 5/2018 | Ruckauer et al. |
| 2018/0129786 | A1 | 5/2018 | Khine |
| 2018/0137642 | A1* | 5/2018 | Malisiewicz ............. G06T 7/11 |
| 2018/0152471 | A1 | 5/2018 | Jakobsson |
| 2018/0211041 | A1 | 7/2018 | Davis |
| 2018/0285773 | A1* | 10/2018 | Hsiao .................. G06N 20/20 |
| 2018/0293381 | A1 | 10/2018 | Tseng et al. |
| 2019/0065744 | A1* | 2/2019 | Gaustad ............. G06F 21/562 |
| 2019/0095805 | A1 | 3/2019 | Tristan |
| 2019/0108338 | A1 | 4/2019 | Saxe et al. |
| 2019/0132355 | A1* | 5/2019 | Egbert .............. H04L 63/1416 |
| 2019/0236273 | A1* | 8/2019 | Saxe .................. G06F 21/562 |
| 2019/0236490 | A1 | 8/2019 | Harang et al. |
| 2019/0258807 | A1 | 8/2019 | DiMaggio et al. |
| 2019/0266492 | A1 | 8/2019 | Harang et al. |
| 2019/0347287 | A1 | 11/2019 | Crossno et al. |
| 2020/0104636 | A1* | 4/2020 | Halevi .................. H04L 9/3239 |
| 2020/0117975 | A1 | 4/2020 | Harang et al. |
| 2020/0257799 | A1 | 8/2020 | Saxe et al. |
| 2021/0241175 | A1 | 8/2021 | Harang et al. |
| 2021/0326440 | A1 | 10/2021 | Saxe et al. |

FOREIGN PATENT DOCUMENTS

| | | | |
|---|---|---|---|
| WO | WO 2019/150079 | A1 | 8/2019 |
| WO | WO 2019/166989 | A1 | 9/2019 |

OTHER PUBLICATIONS

Harang, R. "Estimating weight sharing in multi-task networks via approximate Fisher information," SOPHOS, [online] Retrieved from the Internet https://www.camlis.org/s/harang_CAMLIS17.pdf> Oct. 28, 2017, 31 pages.

Huang, L. et al., "Orthogonal Weight Normalization: Solution to Optimization over Multiple Dependent Stiefel Manifolds in Deep Neural Networks," [Online], Retrieved from the Internet: <URL: https://arxiv.org/pdf/1709.06079.pdf>, Nov. 21, 2017, 20 pages.

International Search Report and Written Opinion for International Patent Application No. PCT/US2018/054558, dated Dec. 10, 2018, 6 pages.

Ioffe and Szegedy, "Batch Normalization: Accelerating Deep Network Training by Reducing Internal Covariate Shift." [Online] Retrieved from the Internet https://arxiv.org/pdf/1502.03167v3.pdf>, Submitted on Feb. 11, 2015 (v1), last revised Mar. 2, 2015 (this version, v3), 11 pages.

Kirkpatrick, J. et al., "Overcoming catastrophic forgetting in neural networks," PNAS (2017); 114 (13): 3521-3526.

Liao and Carneiro, "On the Importance of Normalisation Layers in Deep Learning with Piecewise Linear Activation Units." [Online] Retrieved from the Internet https://arxiv.org/pdf/1508.00330.pdf>, Submitted on Aug. 3, 2015 (v1), last revised Nov. 1, 2015 (this version, v2)), 7 pages.

Liao, et al., "Streaming Normalization: Towards Simpler and More Biologically-plausible Normalizations for Online and Recurrent Learning." Center for Brains, Minds & Machines, Memo No. 057, [Online] Retrieved from the Internet https://arxiv.org/pdf/1610.06160.pdf>, Oct. 19, 2016, 21 pages.

Lundberg, S. M. et al., "A Unified Approach to Interpreting Model Predictions," 31st Conference on Neural Information Processing Systems (NIPS 2017), Long Beach, CA, USA, 10 pages.

Montavon, G. et al., "Methods for Interpreting and Understanding Deep Neural Networks," [Online], Retrieved from the Internet: <URL: https://arxiv.org/pdf/1706.07979.pdf>, Jun. 24, 2017, 14 pages.

Pascanu, R. et al., "Revisiting natural gradient for deep networks," [Online], Retrieved from the Internet: <URL: https:/arxiv.org/pdf/1301.3584v7.pdf>, Feb. 17, 2014, 18 pages.

Ribeiro, M. T. et al., "Model-Agnostic Interpretability of Machine Learning," [Online], Retrieved from the Internet: <URL: https://arxiv.org/pdf/1606.05386.pdf>, Jun. 16, 2016, 5 pages.

Ribeiro, M. T. et al., "'Why Should I Trust You?' Explaining the Predictions of Any Classifier," [Online], Retrieved from the Internet: <URL: https://arxiv.org/pdf/1602.04938v3.pdf>, Aug. 9, 2016, 10 pages.

Ribeiro, M. T., "LIME—Local Interpretable Model-Agnostic Explanations," [Online Blog], Retrieved from the Internet: <URL: https://homes.cs.washington.edu/~marcotcr/blog/lime/>, Apr. 2, 2016, 7 pages.

Salimans, T. et al., "Weight Normalization: A Simple Reparameterization to Accelerate Training of Deep Neural Networks," [Online], Retrieved from the Internet: <URL: https://arxiv.org/pdf/1602.07868.pdf>, Jun. 4, 2016, 11 pages.

Santos and Torres, "Macro Malware Detection using Machine Learning Techniques—A New Approach." In Proceedings of the 3rd International Conference on Information Systems Security and Privacy (ICISSP 2017, SCITEPRESS—Science and Technology Publications, Lda), pp. 295-302, ISBN: 978-989-758-209-7, ElevenPaths, Telefónica Digital Cyber Security Unit, Madrid, Spain. [Online], Retrieved from the Internet on Nov. 19, 2018: http://www.scitepress.org/Papers/2017/61322, 8 pages.

Srivastava, et al., "Dropout: A Simple Way to Prevent Neural Networks from Overfitting." Journal of Machine Learning Research (2014); 15: 1929-1958. Submitted Nov. 2013; Published Jun. 2014, 30 pages.

Tahan, G., et al., "Mal:ID: Automatic Malware Detection Using Common Segment Analysis and Meta-Features." Journal of Machine Learning (2012); (Submitted Aug. 2011; Published Feb. 2012); 1: 1-48, 33 pages.

Theis, L. et al., "Faster gaze prediction with dense networks and Fisher pruning," [Online], Retrieved from the Internet: <URL: https://arxiv.org/pdf/1801.05787.pdf>, Jan. 17, 2018, 10 pages.

Tolomei, G. et al., "Interpretable Predictions of Tree-based Ensembles via Actionable Feature Tweaking," [Online], Retrieved from the Internet: <URL: https://arxiv.org/pdf/1706.06691.pdf>, Jun. 20, 2017, 10 pages.

Tu, M. et al., "Ranking the parameters of deep neural networks using the Fisher information," 41st IEEE International Conference on Acoustics, Speech and Signal Processing, ICASSP 2016—Shanghai, China, Institute of Electrical and Electronics Engineers Inc., pp. 2647-2651 (2016).

(56) References Cited

OTHER PUBLICATIONS

Wu, et al., "L1-Norm Batch Normalization for Efficient Training of Deep Neural Networks." [Online] Retrieved from the Internet https://arxiv.org/pdf/1802.09769.pdf>, Submitted on Feb. 27, 2018, 8 pages.

U.S. Appl. No. 16/257,749, Office Action dated Aug. 11, 2020, 14 pages.

U.S. Appl. No. 16/257,749, Notice of Allowance dated Mar. 1, 2021, 10 pages.

U.S. Appl. No. 15/884,542, Office Action dated Mar. 4, 2021, 53 pages.

U.S. Appl. No. 15/907,807, Office Action dated Apr. 27, 2021, 18 pages.

Augasta and Kathirvalavakumar, "Pruning algorithms of neural networks—a comparative study", Cent. Eur. J. Comp. Sci. (2013); 3(3): 105-115.

Cheplyaka, R., "Rank vs Order in R", Oct. 30, 2017 https://ro-che.info/articles/2016-03-19-rank-vs-order-r (Year: 2017), 4 pages.

Chiba, et al., "Analyzing Spatial Structure of IP Addresses for Detecting Malicious Websites", Journal of Information Processing (Jul. 2013); 21(3): 539-550.

Engelbrecht, Andries P., "A New Pruning Heuristic Based on Variance Analysis of Sensitivity Information", IEEE Transactions on Neural Networks (Nov. 2001); vol. 12, No. 6, pp. 1386-1399.

Tseng, Huihsin et al, U.S. Appl. No. 62/483,102, filed Apr. 7, 2017, 19 pages.

Kang, et al., "Malware Classification Method via Binary Content Comparison", RACS'12, Oct. 23-26, 2012, San Antonio, TX, USA (2012); 6 pages, https://dl.acm.org/doi/pdf/10.1145/2401603.2401672.

Kim, Hae-Jung, "Image-Based Malware Classification Using Convolutional Neural Network", In: Park J., Loia V., Yi G., Sung Y. (eds) Advances in Computer Science and Ubiquitous Computing. Lecture Notes in Electrical Engineering (2018); vol. 474, pp. 1352-1357.

Lison and Mavroeidis, "Neural Reputation Models learned from Passive DNS Data", "Neural reputation models learned from passive DNS data," 2017 IEEE International Conference on Big Data (Big Data), Boston, MA (Dec. 11-14, 2017); pp. 3662-3671, doi: 10.1109/BigData.2017.8258361.

Pennington and Worah, et al., "The Spectrum of the Fisher Information Matrix of a Single-Hidden-Layer Neural Network", 32nd Conference on Neural Information Processing Systems (NeurIPS 2018), Montréal, Canada, pp. 1-16.

Shah, S., et al., "Virus Detection using Artificial Neural Networks; International Journal of Computer Applications", International Journal of Computer Applications (0975-8887) (Dec. 2013); vol. 84, No. 5, pp. 17-23.

Tu, M., et al., "Reducing the Model Order of Deep Neural Networks Using Information Theory", IEEE Computer Society (2016); 2016 IEEE Computer Society Annual Symposium on VLSI, pp. 93-98.

Deo, A., et al., "Prescience: Probabilistic Guidance on the Retraining Conundrum for Malware Detection", AISec '16 Proceedings of the 2016 ACM Workshop on Artificial Intelligence and Security, Oct. 28, 2016, Vienna, Austria, Retrieved from the Internet http://delivery.acm.org/10.1145/3000000/2996769/p71-deo.pdf?ip=69.125.105.131&id=2996769&acc=OPENTOC&key=4D4702B0C3E38B35%2E4D4702B0C3E38B35%2E4D4702B0C3E38B35%2E9F04A3A78F7D3B8D&_acm_=1573741004_98b035a9ad71ffc3e5289851a65d39e7, 12 pages.

Harang and Ducau, "Measuring the speed of the Red Queen's Race", BlackHat USA 2018, Aug. 4-9, 2018, Las Vegas, NV, USA, 18 pages.

Harang and Ducau, "Measuring the speed of the Red Queen's Race", SOPHOS Presentation (2018), Retrieved from the Internet https://i.blackhat.com/us-18/Wed-August-8/us-18-Harang-Measuring-the-Speed-of-the-Red-Queens-Race.pdf, 48 pages.

Harang and Rudd, "Principled Uncertainty Estimation for Deep Neural Networks". [Online] arXiv:1810.12278 [cs.LG], [v1] Oct. 29, 2018, Retrieved from the Internet https://arxiv.org/abs/1810.12278v1.pdf, 8 pages.

International Preliminary Report on Patentability for International Patent Application No. PCT/US2018/054558, dated Apr. 8, 2020, 5 pages.

International Search Report and Written Opinion for International Patent Application No. PCT/GB2019/050199, dated Mar. 29, 2019, 15 pages.

International Search Report and Written Opinion for International Patent Application No. PCT/IB2019/050642, dated Apr. 12, 2019, 12 pages.

International Search Report and Written Opinion for International Patent Application No. PCT/IB2019/051629, dated Jun. 17, 2019, 14 pages.

International Search Report and Written Opinion for International Patent Application No. PCT/GB2019/052222, dated Nov. 12, 2019, 17 pages.

International Search Report and Written Opinion for International Patent Application No. PCT/GB2020/050188, dated Mar. 31, 2020, 12 pages.

Kardan and Stanley, "Fitted Learning: Models with Awareness of their Limits". [Online] arXiv:1609.02226v4 [cs.AI] Jul. 9, 2018, Retrieved from the Internet https://arxiv.org/pdf/1609.02226.pdf, 19 pages.

Narayanan, et al., "A multi-view context-aware approach to Android malware detection and malicious code localization." Empir Software Eng (2018); 23: 1222-1274. Epub Aug. 30, 2017.

Rudd, E.R., et al., "MOON: A Mixed Objective Optimization Network for the Recognition of Facial Attributes." [Online], Retrieved from the Internet: <URL:https://arXiv.org/abs/1603.07027>, arXiv:1603.07027 [cs.CV], Mar. 22, 2016, 17 pages.

Rudd, et al., "MEADE: Towards a Malicious Email Attachment Detection Engine", 2018 IEEE International Symgosium on Technologies for Homeland Security (HST), IEEE, Oct. 23, 2018, pp. 1-7.

Rudd, et al., "The Extreme Value Machine". [Online] arXiv:1506.06112v4 [cs.LG] May 21, 2017, Retrieved from the Internet https://arxiv.org/abs/1506.06112.pdf, 12 pages.

Sanghani, et al., "Personalized spam filtering using incremental training of support vector machine". 2016 International Conference on Computing, Analytics and Security Trends (CAST), IEEE Dec. 19, 2016, pp. 323-328, 6 pages.

Saxe and Berlin, "Deep Neural Network Based Malware Detection Using Two Dimensional Binary Program Features," IEEE 2015, 10th International Conference on Malicious and Unwanted Software: "Know Your Enemy" (Malware), 2015, pp. 11-20.

Saxe and Berlin, "eXpose: A Character-Level Convolutional Neural Network with Embeddings for Detecting Malicious URLs, File Paths and Registry Keys." [Online], Retrieved from the Internet: <https://arxiv.org/abs/1702.08568>, arXiv: 1702.08568v1 [cs.CR], Feb. 27, 2017, 18 pages.

Schultz, et al., "Data Mining Methods for Detection of New Malicious Executables", Proceedings of the 2001 IEEE Symposium on Security and Privacy (2001); Oakland, CA, May 14-16, 2001; [Proceedings of the IEEE Symposium on Security and Privacy], Los Alamitos, CA: IEEE Comp. Soc., US, May 14, 2001, pp. 38-49, 12 pages.

Sethi and Kantardzic, "Handling adversarial concept drift in streaming data". Expert Systems With Applications (May 1, 2018); 97: 18-40. Available online Dec. 11, 2017.

Tian, et al., "An automated classification system based on the strings of trojan and virus families." Malicious and Unwanted Software (MALWARE); 2009 4th International Conference, Piscataway, NJ, USA, Oct. 13, 2009, pp. 23-30, 8 pages.

Velez and Clune, Identifying Core Functional Networks and Functional Modules within Artificial Neural Networks via Subsets Regression, GECCO '16, Proceedings of the Genetic and Evolutionary Computation Conference 2016, Jul. 20-24, 2016, pp. 181-188.

Notice of Allowance in U.S. Appl. No. 15/727,035, dated Dec. 27, 2019, 7 pages.

(56) References Cited

OTHER PUBLICATIONS

U.S. Appl. No. 15/884,542, Office Action dated Sep. 9, 2021, 44 pages.
U.S. Appl. No. 15/884,542, Office Action dated Apr. 5, 2022, 32 pages.
U.S. Appl. No. 16/158,844, Office Action dated May 24, 2022, 25 pages.
U.S. Appl. No. 16/853,803, Office Action dated May 2, 2022, 9 pages.
Xu, K., et al., "DeepRefiner: Multi-layer Android Malware Detection System Applying Deep Neural Networks," IEEE European Symposium on Security and Privacy, 2018, 15 pages.

* cited by examiner

METHODS AND APPARATUS FOR USING MACHINE LEARNING TO DETECT POTENTIALLY MALICIOUS OBFUSCATED SCRIPTS

BACKGROUND

The embodiments described herein relate to methods and apparatus for detecting obfuscated scripts in files using machine learning. More particularly, the embodiments described herein relate to methods and apparatus for extracting text from files and detecting obfuscated scripts that are embedded in the text that can potentially carry out malicious activity.

Malicious scripts can be embedded in text within files that are seemingly harmless in appearance but hard to detect and can be prone to cause severe damage or compromise of sensitive hardware, data, information, and the like.

The use of machine learning tools, including neural networks, can include one or more steps of data pre-processing such as feature extraction. Feature extraction can be used to capture features of the files or text to be analyzed and convert the captured features into a feature vector to present as input to the neural network. Some known implementations of feature extraction, however, can fail to capture associations between various strings included in obfuscated scripts that can be indicative of the malicious nature of the scripts.

Thus, a need exists for improved apparatuses and methods for better capturing indications of maliciousness in strings included in obfuscated scripts and to detect the obfuscated scripts as potential sources of malicious activity.

SUMMARY

According to an embodiment, an apparatus includes a memory and a processor for detecting potentially malicious, obfuscated scripts in a file, and determining a maliciousness classification of the file based on the potentially malicious, obfuscated scripts. The processor is operatively coupled to the memory. The processor is configured to extract a set of scripts from a potentially malicious file. The processor is further configured to concatenate a representation of each script from the set of scripts with a representation of the remaining scripts from the set of scripts to define a script string. The processor is further configured to generate a set of n-gram representations of the script string. Each n-gram representation from the set of n-gram representations has a set of n-grams, and each n-gram from the set of n-grams of each n-gram representation from the set of n-gram representations is of a size different than a size of each n-gram from the set of n-grams of each remaining n-gram representation from the set of n-gram representations. The processor is further configured to define a feature vector based on the set of n-gram representations of the script string for input of the feature vector to a neural network. The processor is further configured to determine a maliciousness classification of the file based on output from the neural network. The output is associated with the input feature vector.

DETAILED DESCRIPTION

Figure 1:
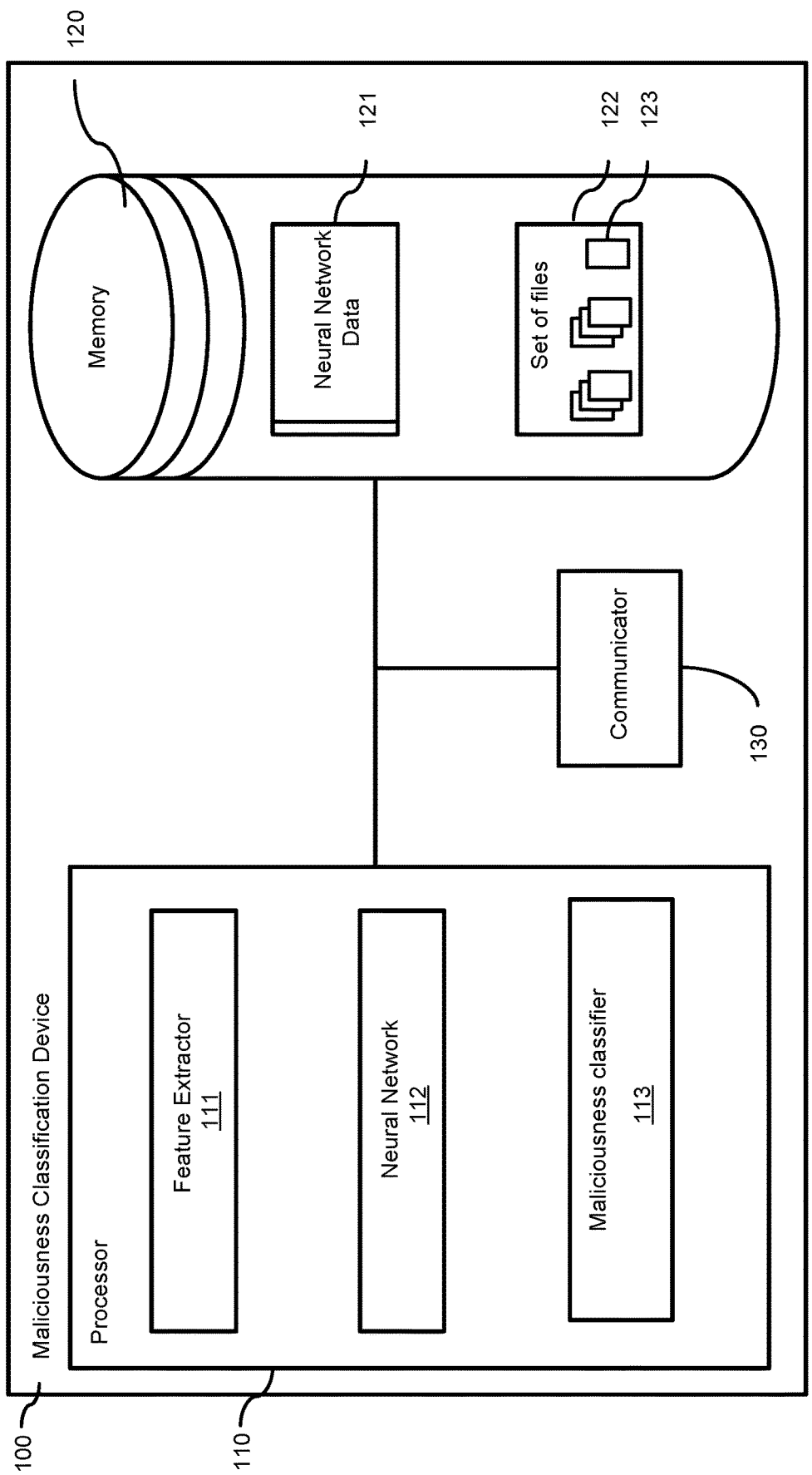
FIG. 1 is a schematic block diagram of a Maliciousness Classification Device for evaluating and classifying a potentially malicious file, according to an embodiment.

In some embodiments, an apparatus includes a memory and a processor operatively coupled to the memory. The processor can be configured to extract a set of features from a potentially malicious file to generate an input vector that captures combinations of the extracted features. The processor can be configured to provide the input vector as an input to an input layer of a neural network used to classify the potentially malicious file. The processor can be configured to implement the neural network such that hidden associations between extracted features can be analyzed to indicate the presence of obfuscated scripts in the potentially malicious file. The neural network can be used to produce a maliciousness classification of the potentially malicious file.

In some embodiments, the processor can be configured to, train the neural network using files having a maliciousness classification known to the neural network, and then test the performance of the neural network in classifying files having a maliciousness classification unknown to the neural network.

In some embodiments, a non-transitory processor-readable medium stores program instructions for execution by a processor. The program instructions, when executed by the processor, are configured to cause the processor to extract a set of scripts from a file, and define a feature vector based on an n-gram representation of the set of scripts. The program instructions are further configured to cause the processor to provide the feature vector as an input to a neural network having no more than 128 inputs and at least 6 layers. The neural network can be configured to generate an output based on the input feature vector. The program instructions are further configured to cause the processor to determine a maliciousness classification of the file based on the output.

In some embodiments, a method includes receiving a file and extracting a set of scripts from the file. The method further includes generating a set of n-gram representations of the set of scripts. Each n-gram representation from the set of n-gram representations has a set of n-grams, and each n-gram from the set of n-grams of each n-gram representation from the set of n-gram representations is of a size different than a size of each n-gram from the set of n-grams of each remaining n-gram representation from the set of n-gram representations. The method further includes defining a feature vector based on the generated n-gram representations, and providing the feature vector as an input to a neural network for output. The method further includes determining a maliciousness classification of the file based on the output.

Computer files ("computer file(s)" or "file(s)") such as text or document files (collectively, "document file(s)") can be a common delivery mechanism for malware (i.e., malicious software). For example, document files can include embedded, executable scripts or macros that, in some cases, can be configured to cause malicious activity on a host device (e.g., a computer) or in a host environment (e.g., of a computer, virtual machine, etc.). The flexibility of many embedded scripting languages allows for easy obfuscation of malicious scripts within files such as document files, such that the files appear harmless. Obfuscated scripts can be evasive and hard to detect, making signature-based detection of malicious, executable scripts embedded in files such as document files error-prone and unreliable.

Accordingly, there is a need for apparatuses and methods to detect potentially malicious, obfuscated scripts embedded in files that overcomes the aforementioned problems in the art. Disclosed herein are apparatuses and methods to detect potentially malicious, obfuscated scripts, which can often evade detection by common, signature-based malicious software detection engines, and the like.

While the methods and apparatus are described herein as processing and/or classifying files, in other instances a maliciousness classification device (such as maliciousness classification device 100 of FIG. 1) can be used to process and/or classify any collection or stream of artifacts, events, objects, and/or data. As an example, a maliciousness classification device can process and/or classify an artifact such as, for example, any portable executable file(s), registry key(s), dataset(s), filepath(s), Uniform Resource Locator (URL), device(s), device behavior, user behavior, network behavior, network identifier, and/or entity represented and/or associated with computer-related resources. For further examples, an artifact can include a function of code (e.g. of software code, source code, machine code), a webpage(s), a data file(s), a model file(s), a source file(s), a script(s), a process, a binary executable file(s), a table(s) in a database system, a development deliverable(s), an active content(s), a word-processing document(s), an e-mail message(s), a text message, a network address, a device or entity (e.g., a network-connected compute device and/or computer system, a server, a smartphone, a tablet, a laptop, a multimedia device, etc.), a network address (e.g.; a Media Control (MAC) address, Internet Protocol (IP) address, etc.) of a compute device, and/or the like.

As another example, a maliciousness classification device can process and/or classify an event stream such as a series of function calls and/or instructions, an occurrence of specific data types and/or instructions within a given time period, a series of network traffic events, and/or the like. As yet another example, a maliciousness classification device can process and/or classify data streams including, for example, video data, image data, audio data, textual data, and/or the like. As a further example, a maliciousness classification device can process and/or classify configuration data such as, for example, device settings, network settings, application settings, registry keys, and/or the like.

FIG. 1 is a schematic block diagram of a maliciousness classification device 100 for evaluating potentially malicious files, according to an embodiment. The maliciousness classification device 100, also referred to herein as "the classification device" or "the device", can be a hardware-based computing device and/or a multimedia device, such as, for example, a compute device, a server, a desktop compute device, a laptop, a smartphone, a tablet, a wearable device, an implantable device, and/or the like. The maliciousness classification device 100 includes a processor 110, a memory 120 and a communicator 130.

The processor 110 can be, for example, a hardware based integrated circuit (IC) or any other suitable processing device configured to run and/or execute a set of instructions or code. For example, the processor 110 can be a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor 110 is operatively coupled to the memory 120 through a system bus (for example, address bus, data bus and/or control bus).

The processor 110 can include a feature extractor 111, a neural network 112, and a maliciousness classifier 113. The feature extractor 111, the neural network 112, and/or the maliciousness classifier 112 can be software stored in memory 120 and executed by processor 110 (e.g., code to cause the processor 110 to execute the feature extractor 111, the neural network 112, and/or the maliciousness classifier 112 can be stored in the memory 120) and/or a hardware-based device such as, for example, an ASIC, an FPGA, a CPLD, a PLA, a PLC and/or the like.

The feature extractor 111 can be configured to receive or retrieve a file as an input and output a feature vector associated with the file. In some implementations, the feature extractor 111 extracts features from the file to form, generate, and/or otherwise define a feature vector, such as to express, represent, and/or provide indication of the extracted features. In some implementations, the feature extractor 111 can be configured to implement various pattern recognition techniques such as those including parsing, detection, identification, rules, evaluating, generating, or defining a set of values associated with the file. The extracted features of the file can include, resemble, or correspond to various data types, such as of streams, files, headers, variable definitions, routines, sub-routines, strings, elements, subtrees, tags, text containing embedded scripts, and the like.

The extracted features can serve as predictors that will form the input vector of a classifier and/or machine learning model, as described herein. For example, some features may have no impact on the result of the classification, others however may have a direct correlation, and some features may be correlated with and/or interact with other features and in turn be decisive for the outcome.

In some implementations the feature extractor 111 can generate a set of n-gram representations associated with the extracted features, and input each n-gram from each n-gram representation (e.g., each n-gram being representative of a feature) to a hash function to produce a hash value. The feature extractor 111, using the hash values, can form a feature vector (e.g., of pre-determined length and/or of variable length).

As an example, in some implementations, the feature extractor 111 can be configured to extract features of a document file such as a word processing file (e.g., a .doc' file). In some implementations the features can include or correspond to internal representations or structures of the document file. As another example, in some implementations, the feature extractor 111 can be configured to extract features of other data types or structures, such as, for example, text or character streams, program instructions, macros, embedded Visual Basic Application (VBA) code, metadata associated with a word processing file, scripts, strings associated with code, and/or the like.

In some implementations, the feature extractor 111 can then, for example, tokenize the extracted features into printable strings, such as by not including XML delimiting characters ('<' or '>'), or removing any length less than a specified length (e.g., 5 characters). In some implementations, the feature extractor 111 can be configured to concatenate the representations of two or more features to form a single feature representation ("script string", "single feature representation", "file feature representation", "text feature representation", "feature representation").

For example, the feature extractor 111 can extract a set of scripts from a file and concatenate a representation of each script in the set of scripts, to form a single representation (e.g., a script string, sequence of characters, etc.). In some implementations, the feature extractor 111 can then use the single representation to generate a set of n-gram representations. Each n-gram representation can include a set of n-grams having a different length than the n-grams of the set of n-grams in the remaining n-gram representations. Similarly stated, the feature extractor 111 can generate a set of n-gram representations having n-grams of varying length 'n' (e.g., including a unigram, bigram, 3-gram, 4-gram, 5-gram representations, etc., as described with reference to FIG. 2). In some implementations, the feature extractor 111 can be configured to provide each n-gram as in input to a hash function to define a feature vector based on the representation-grams of varying lengths.

Figure 2:
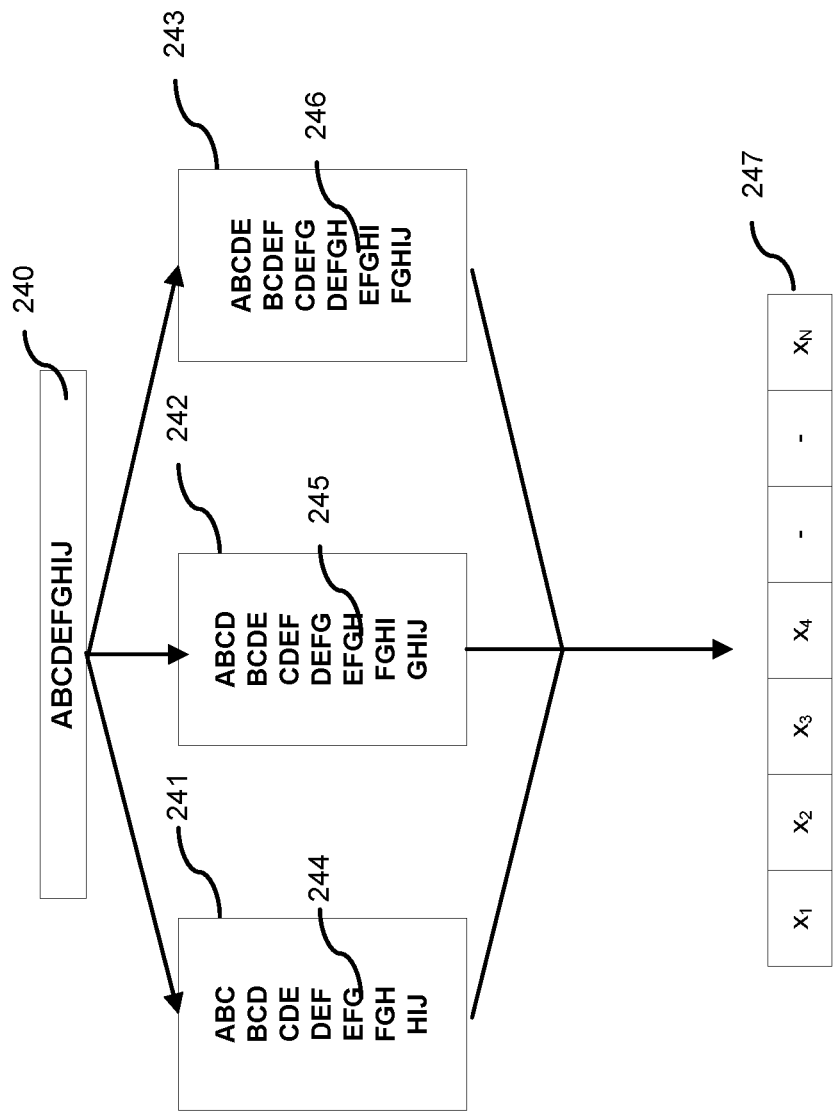
FIG. 2 is a schematic diagram of feature extraction for generating an input vector to be provided as input to a neural network, according to an embodiment.

FIG. 2 is a schematic diagram of feature extraction for generating an input vector to be provided as input to a neural network, according to an embodiment. A single feature representation 240 can be formed from multiple features extracted from the file. For example, strings associated with scripts (e.g., AB, CDEF, and GHIJ) can be extracted from the file and concatenated to form a single script string (e.g., ABCDEFGHIJ).

As shown, based on a single feature representation 240 (e.g., concatenated by the feature extractor 111), the feature extractor 111 can be configured to generate a 3-gram representation 241, a 4-gram representation 242, and a 5-gram representation 243. As shown, the three-gram representation 241 includes a set of three-grams 244 (e.g., 'ABC', 'BCD', etc.), the four-gram representation 242 includes a set of four-grams 245 (e.g., 'ABCD', 'BCDE', etc.), and the five-gram representation 243 includes a set of five-grams 246 (e.g., 'ABCDE', 'BCDEF', etc.). Such n-grams can be defined from the single feature representation 240 using a rolling and/or sliding window such that each character in the single feature representation 240 can be in multiple n-grams of the same size and of different sizes. Specifically, in the example shown in FIG. 2, the first three characters (i.e., characters in positions 1, 2 and 3 of the single feature representation 240) can be the first 3-gram "ABC", the window can then slide to the next three characters (i.e., characters in positions 2, 3 and 4 of the single feature representation 240) to define the second 3-gram, and so on. This can also be repeated for the other n-gram representations 241 and 243 as shown in FIG. 2.

In some implementations, for example, the feature extractor 111 can be configured to implement a hash function to generate a hash value for each n-gram from the sets of three-, four-, and five-grams 244-246. For example, the feature extractor 111 can be configured to input each n-gram to a hash function to produce a hash value for that n-gram and, using the hash values, define a feature vector 247, such as of pre-determined length and/or of variable length. As shown in FIG. 2, the feature vector 247 can be defined to include a set of buckets (e.g., indices, multiset, mset, sections, portions, etc.) $x_1$, $x_2$, $x_3$, $x_4$, . . . , $x_N$, to which words, n-grams, and the like, can be hashed and/or mapped. In some implementations, the feature extractor 111 can be configured to define the feature vector 247 by providing each n-gram of the sets of three-, four-, and five-grams 244-246 of each n-gram representation from the generated set of n-gram representations (e.g., of a concatenated script string) as input to a hash function to produce a corresponding hash value for each n-gram. For example, each n-gram representation can be hashed and/or mapped to the buckets $x_1$, $x_2$, $x_3$, $x_4$, . . . , $x_N$ of the feature vector 247. Accordingly, the feature vector 247 can be a defined as a count of the hashes to each bucket $x_1$, $x_2$, $x_3$, $x_4$, . . . , $x_N$, of the feature vector 247, respectively. As an example, the feature vector 247 can be defined to be a representation of the features associated with each n-gram used to define the feature vector 247, as described herein.

In some implementations, the feature extractor 111 can be configured to define the feature vector 247 by counting each n-gram that is hashed or mapped into each bucket of the feature vector 247. For example, in some implementations, the feature extractor 111 can be configured to define the feature vector 247 by providing, as an input to a hash function based on and with respect to the concatenated single feature representation 240, each n-gram 244-246 from the set of n-grams of each n-gram representation 241-243 from the generated set of n-gram representations. In some implementations, the feature extractor 111 can be configured to implement any other suitable process (e.g., mapping or transform process), in accordance with the present disclosure.

The feature extractor 111 can use the hash values to form the feature vector 247. In some cases, the hashing can be performed to reduce the feature space into a set of blocks having a pre-determined size (for example, a block size of 512, a block size of 1024, a block size of 2048 and/or the like). Reducing or otherwise limiting a size of the feature vector input to the neural network 112 can reduce the size and/or complexity of the neural network 112, reducing a likelihood of overfitting by the neural network 112.

In some implementations, the feature extractor 111 can be configured to hash a different number of n-gram representations to the feature vector 247. For example, instead of using three distinct sizes of n-gram representations as shown in FIG. 2, the feature extractor 111 can be configured to use four or more distinct sizes of n-gram representations. In some implementations, the feature extractor 111 can also be configured to define the feature vector using other n-gram sizes beyond those shown in FIG. 2 (e.g., 2-grams, 6-grams, 7-grams, 8-grams, 9-grams, etc.). Thus, any number of n-gram representations of various sizes can be used to define the feature vector.

In some implementations, the feature extractor 111 can hash or map the n-grams of the various n-gram representations, regardless of size, to the same feature vector. Moreover, in some implementations, the feature extract 111 can hash or map the n-grams of the various n-gram representations, regardless of size, to the same portion and/or buckets in a feature vector (e.g. feature vector 247). For example, a hash of a 3-gram might map to the same bucket in the feature vector as a hash of a 4-gram. Alternatively, in some implementations, the feature extractor 111 can be configured to hash or map each n-gram representation, based on size, to a particular portion of the feature vector. In such an implementation, for example, the 3-grams would hash to a specific range of buckets in the feature vector while the 4-grams would map to a different range of buckets in the feature vector.

In other implementations, any other suitable processes, characteristics and/or values can be used to define the feature vector and/or set of values associated with the file. For example, in some instances, the feature vector can be formed from extracted features based on a lookup table, a data map, an associative array, and/or any other data structure and/or function. Such a function can be used instead of or in addition to a hash function. For another example, any other data extracted and/or calculated from the file such as string length values associated with strings within the file, a variance of string length values associated with strings within the file, informational entropy values associated with the file (e.g., calculated based on a frequency of byte values, sequences and/or patterns within one or more byte windows of the file), byte values within the file, values computed based on byte values within the file (e.g., byte value ranges within the file, a standard deviation associated with byte values in the file, etc.) a length of the file, an author of the file, a publisher of the file, a compilation date of the file, data pertaining to whether a valid signature is included with the file, other information that can be parsed from a Portable Executable (PE) file (including but not limited to the size of the header and/or the size of components of the file, such as image sizes and/or the size of the code, versions of operating systems configured to run and/or open the file, section names, entry points, symbol table information, and/or similar information), images and/or representation of images associated with the file, and/or the like, can be used to define the feature vector and/or set of values associated with the file. Additional detail regarding such data extracted and/or calculated from the file can be found in U.S. patent application Ser. No. 15/228,728, filed Aug. 4, 2016 and titled "Methods and Apparatus for Machine Learning Based Malware Detection, now U.S. Pat. No. 9,690,938, and U.S. patent application Ser. No. 15/343,844, filed Nov. 4, 2016 and titled "Methods and Apparatus for Detecting Malware Samples with Similar Image Sets," now U.S. Pat. No. 9,672,358, each of which is incorporated herein by reference in its entirety.

Returning to FIG. 1, the neural network 112 can be a neural network configured to have an input layer, an output layer, and one or more hidden layers (e.g., including a normalization layer and an activation layer), as described in further detail herein. The neural network 112 can be configured to receive a feature vector, or a set of values associated with a file in the form of an input vector (e.g., the feature vector 274 of FIG. 2), at the input layer, iteratively perform computations based on the inputs, using the normalization and activation layers of the one or more hidden layers, and output, via the output layer, an indication associated with classification of the file. For example, the neural network 112 can provide an output indicating a maliciousness classification of a file. The maliciousness classification can include information regarding whether a file is classified as a threat. The maliciousness classification can classify a file into different categories such as, for example, benign, potentially malicious, malicious content, type of malicious content, class of malicious content, malware family and/or the like.

In some instances, the neural network 112 can have connected nodes in different layers (for example, input layer, hidden layer(s) and/or output layer) of the neural network 112. The input layer an include one or more input nodes configured to receive an input vector (e.g., feature vector 247 of FIG. 2) associated with a set of features extracted from a file (e.g., file 123 indicated in FIG. 1). The input vector can be, in some implementations, a set of values associated with the file as described herein. For example, the neural network 112 can perform one or more tasks such as, for example, performing content classification, performing behavior classification, categorizing different file types, classifying different image types and/or the like. Content classification and behavior classification can be used, for example, to identify the likelihood that a file or a behavior is associated with a security threat (e.g., malware).

In some implementations, the neural network 112 can be a narrow and deep neural network. For example, in some implementations, the narrow and deep neural network can include a 64-node width and a 4 or 5 layer depth. As another example, in some implementations, the narrow and deep neural network can include no more than 128 inputs and at least 6 layers. As another example, in some implementations, the narrow and deep neural network can include a number of inputs corresponding to a block size of a feature vector (e.g. feature vector 247) to be input (e.g., 128 input nodes to receive an input vector of block size 128, 512 input nodes to receive an input vector of block size 512, etc.). In other implementations, the neural network can have any other suitable number of input nodes (e.g., 16, 32, 256, etc.) and/or any other suitable number of layers (e.g., 6, 7, 8, 9, 10, etc.).

Advantageously, this can enhance an implementation scalability of the neural network 112 and reduce the chance that the neural network is prone to overfitting. Specifically, the width of the neural network can be proportional to a size and complexity of a feature space (e.g., of feature vector 247). In particular, a width of a neural network to which an input vector can be provided can be proportional to a size of a feature space of the input vector. Advantageously, implementing such a narrow neural network can reduce or limit a size of a feature space of an input vector (e.g., feature vector 247), to thereby increase a scalability of the neural network 112 and reduce overfitting of the neural network 112. Moreover, the depth of the neural network 112 can increase the analysis of interactions between different features. For example, having a deep neural network 112 increases the analysis and/or examination of interactions between features. This allows the neural network 112 to better identify maliciousness based on the interactions of features (e.g., based on the interaction and/or presence of multiple scripts or macros). In some implementations, for example, the feature vector 247 can be provided such that the neural network 112 detects an interaction between a script from the set of scripts and at least one other script from the set of scripts, where the output is based at least in part on the interaction.

The maliciousness classifier 113, also referred to herein as "the classifier", can be configured to receive the output of the neural network 112 and calculate or classify the maliciousness of the received file. For example, in some implementations, the classifier 113 can receive an output vector from the neural network 112 and produce a binary classification of whether the file is determined to be benign or malicious. In other implementations, for example, the classifier 113 can receive the output vector from the neural network 112 and produce a value associated with a confidence that the file is benign or malicious. In some other implementations, the classifier 113 can receive the output vector from the neural network 112 and based on the output vector, associate the file with a known class of malicious files among several known classes of malicious files.

The memory 120 of the maliciousness classification device 100 can be, for example, a random access memory (RAM), a memory buffer, a hard drive, a read-only memory (ROM), an erasable programmable read-only memory (EPROM), and/or the like. The memory 120 can store, for example, one or more software modules and/or code that can include instructions to cause the processor 110 to perform one or more processes, functions, and/or the like (e.g., the feature extractor 111, the neural network 112, and/or the maliciousness classifier 113). In some implementations, the memory 120 can be a portable memory (e.g., a flash drive, a portable hard disk, and/or the like) that can be operatively coupled to the processor 110. In other instances, the memory can be remotely operatively coupled with the maliciousness classification device. For example, a remote database server can be operatively coupled to the maliciousness classification device.

The memory 120 can store neural network data 121 and a set of files 122. The neural network data 121 can include data generated by the neural network 112 during classification of a file (e.g., temporary variables, return addresses, and/or the like). The neural network data 121 can also include data used by the neural network 112 to process and/or analyze a file (e.g., weights associated with the nodes of a neural network 112, parameters associated with normalization of inputs by one or more normalization layers of the neural network 112, decision points associated with the neural network 112, and/or other information related to the neural network 112).

In some instances, the neural network data 121 can also include data used to train the neural network 112. In some instances, the training data can include multiple sets of data. Each set of data can contain at least one pair of an input file and an associated desired output value or label. For example, the training data can include input files pre-categorized into categories such as, for example, malicious files and benign files, or types of malicious files. The training data can be used to train the neural network 112 to perform classification of data and/or files. For example, the neural network 112 can be trained by using any suitable backpropagation algorithm.

The communicator 130 can be a hardware device operatively coupled to the processor 110 and memory 120 and/or software stored in the memory 120 and executed by the processor 110. The communicator 130 can be, for example, a network interface card (NIC), a Wi-Fi™ module, a Bluetooth® module and/or any other suitable wired and/or wireless communication device. Furthermore the communicator 130 can include a switch, a router, a hub and/or any other network device. The communicator 130 can be configured to connect the maliciousness classification device 100 to a communication network (not shown in FIG. 1). In some instances, the communicator 130 can be configured to connect to a communication network such as, for example, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof.

In some instances, the communicator 130 can facilitate receiving and/or transmitting a file and/or a set of files through a communication network. In some instances, a received file can be processed by the processor 110 and/or stored in the memory 120 as described in further detail herein.

In use, the processor 110, included in the maliciousness classification device 100, can be configured to retrieve a file (such as, for example, file 123) belonging to a set of files (such as, for example, set of files 122) from the memory 120. The feature extractor 111, included in and/or executed by the processor 110, can be configured to receive the first file and extract a set of features from the first file (or otherwise identify a set of values associated with the file) to define a feature vector. This feature vector can be stored in the memory 120. The processor 110 can then be configured to provide the stored feature vector from the memory 120 to the neural network 112. The neural network 112 can be configured to analyze the feature vector to determine a classification associated with the first file. The processor 110 can be configured to store the determined classification in the memory 120.

The maliciousness classifier 113, included in the processor 110, can be configured to receive and evaluate the output of the neural network 112 and produce a maliciousness classification for the file to indicate whether the file is malicious or benign (e.g., classify the file as benign or malicious, classify the file as a type of malware, etc.). For example, in some instances the classifier 113 can receive an output vector from the neural network 112 and evaluate the values in the output vector in combination with one or more preset criteria to determine a malware class to which the file 123 belongs.

As described herein, it is understood that a maliciousness classification device (similar to maliciousness classification device 100 shown and described with respect to FIG. 1) can include a neural network (such as the model 112) that can be trained for use in classifying one or more data sets, such as files. As an example, a maliciousness classification device can be implemented to perform the methods described herein to receive a file, extract a set of features from the file, and further to use the set of features in classifying the file by implementing a neural network.

Figure 3:
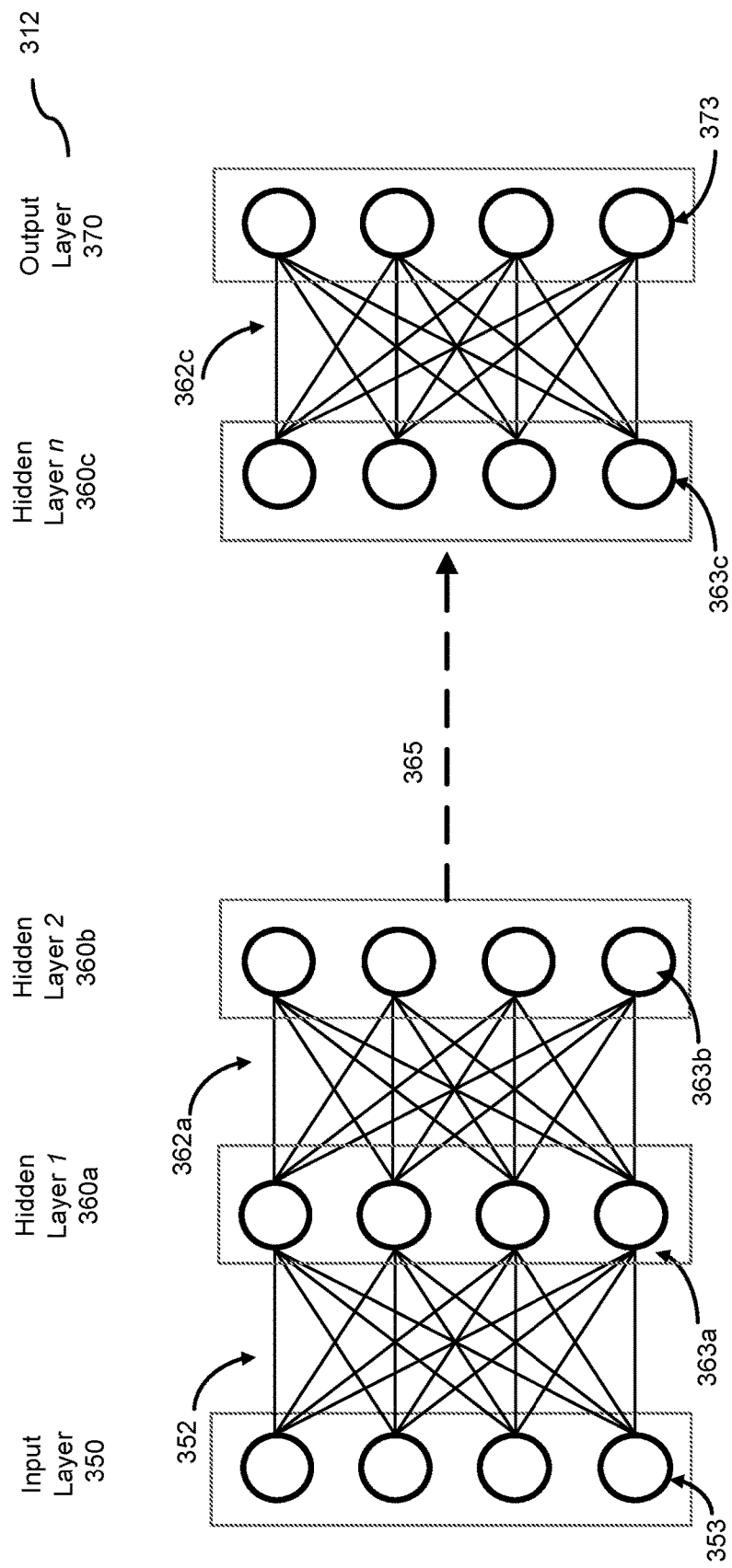
FIG. 3 is a schematic representation of a neural network, according to an embodiment.

FIG. 3 is a schematic representation of a neural network 312, according to an embodiment. The neural network 312 can be a part of a maliciousness classification device such as the device 100 described with respect to FIG. 1. The neural network 312 can be the same as or substantially similar to the neural network 112 described with respect to FIG. 1. For example, the neural network 312 can include an input layer 350, one or more hidden layers 360*a*-*c*, and an output layer 370. Each hidden layer 360*a*-*c* can include a normalization layer (not depicted) and an activation layer (not depicted). The input layer 350, the hidden layers 360*a*-*c*, and the output layer 370 are connected by interlayer connections 352, 362*a*, and 362*c*, respectively.

The input layer 350 of the neural network 312 can include one or more input nodes 353 configured to receive a set of values associated with a file in the form of an input vector associated with a set of features extracted from the file (e.g., file 123 of FIG. 1). The hidden layers 360*a*-*c* can each include a normalization layer (not depicted) and an activation layer (not depicted). The number of input nodes 353 and the number of layers (e.g. input layer 350, hidden layer 360*a*-*c*, output layer 370) can be chosen such that the neural network 312 can be a deep and narrow neural network, as described herein.

For example, in some implementations, the neural network 312 can include a 64-node width and a 4 or 5 layer depth. As another example, in some implementations, the neural network 312 can include no more than 128 inputs and at least 6 layers. As another example, in some implementations, the neural network 312 can include a predetermined number of inputs and at least one input layer, an output layer, and one or more hidden layers, as described herein. The predetermined number of inputs can correspond, for example, to a predetermined length of a feature vector to be input to the neural network 312. In other implementations, the neural network can have any other suitable number of input nodes (e.g., 16, 32, 256, etc.) and/or any other suitable number of layers (e.g., 6, 7, 8, 9, 10, etc.). In some instances, the neural network 312 can be narrow to reduce the chance of overfitting. In some instances, the neural network 312 can be deep to sufficiently capture interactions between different features in the feature vector.

In use, a set of features such as for example, scripts, obfuscated scripts, macros, headers, variable definitions, routines, sub-routines, strings, elements, subtrees, tags and/or the like can be extracted from a file by a feature extractor (e.g. via feature extractor 111) and used to define a feature vector (e.g. feature vector 247). The feature vector can be a set of values in the input vector of a predetermined size that can be provided to a neural network 312. For example, the feature extractor can normalize each feature and/or input each feature to a hash function to produce a hash value. The feature extractor, using the hash values, can form a feature vector (e.g., of predetermined length and/or of variable length). For example, in some implementations, the feature extractor can be configured to extract and/or identify features of a word processing file (e.g., a .doc' file) having scripts and/or macros. The feature extractor can use the hash values to form a feature vector representative of and/or indicative of the scripts and/or macros. In some instances, the hashing can be performed to reduce the feature space into a set of blocks having a predetermined size (for example, a block size of 512, a block size of 1024, a block size of 2048 and/or the like).

The feature vector (e.g., feature vector 247 of FIG. 2) can be provided to the input layer 350 of the neural network 312. The number of input nodes 353 in the input layer 350 can correspond to the block size of the feature vector (e.g., 128 input nodes to receive an input vector of block size 128). The number of layers of the neural network 312 can be chosen such that the neural network 312 can be a narrow and deep neural network, as described herein.

Figure 4:
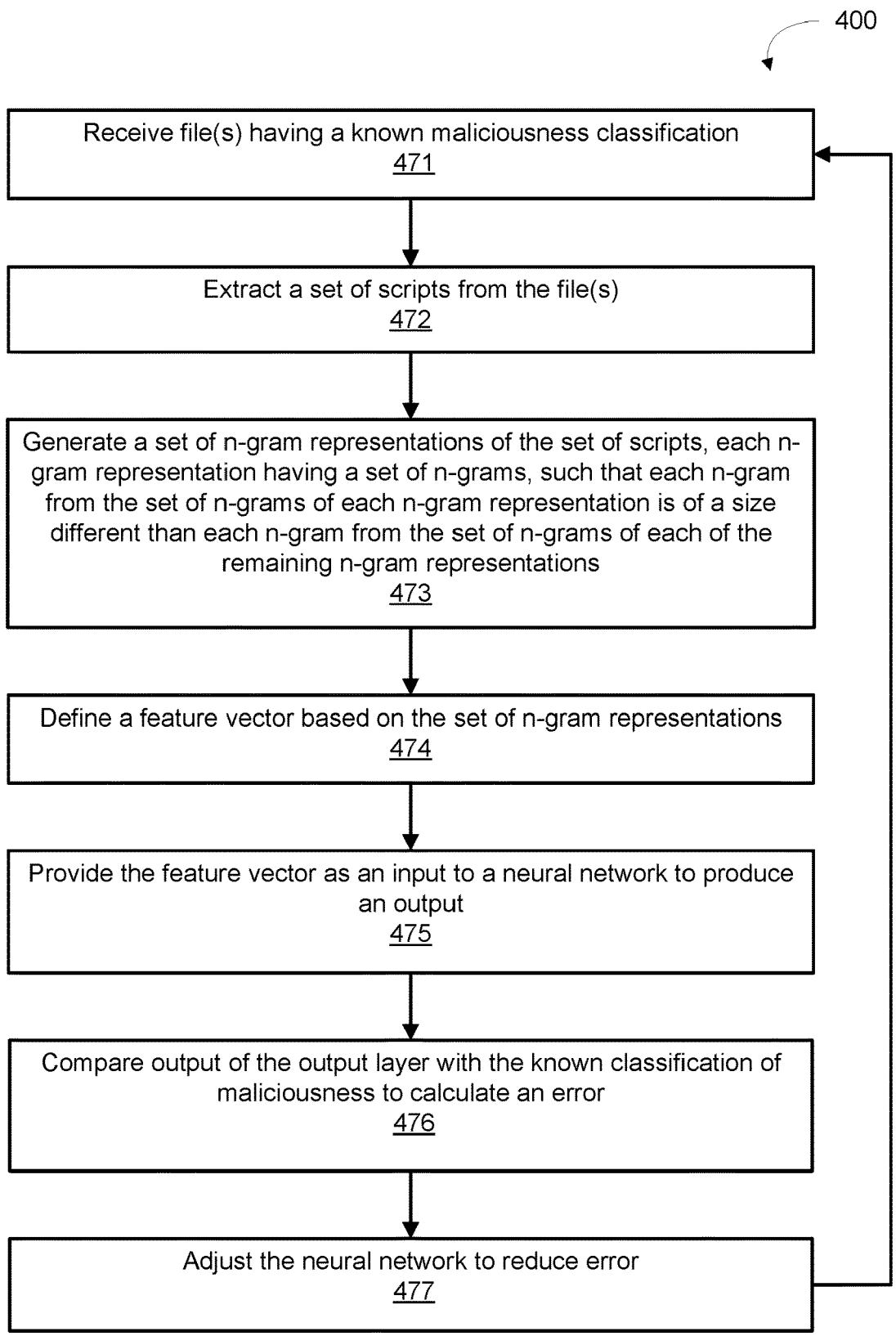
FIG. 4 is a flowchart illustrating a method for training a neural network to classify one or more files based on maliciousness by detecting associations in text indicative of obfuscated scripts, according to an embodiment.

FIG. 4 is a flowchart illustrating a method 400 for training a neural network (e.g., similar to the networks 112 and 312 shown and described with respect to FIGS. 1 and 3, respectively), according to an embodiment. At 471, a processor (e.g., similar to the processor 110 shown and described with respect to FIG. 1) receives file(s) having a maliciousness classification known to a neural network.

At 472, a feature extractor (e.g., similar to the feature extractor 111 shown and described with respect to FIG. 1) extracts a set of scripts from the file(s). In some instances, strings associated with the set of scripts can be concatenated to define a script string.

At 473, the feature extractor generates a set of n-gram representations of the set of scripts (e.g., after defining a script string). Each n-gram representation from the set of n-gram representations has a set of n-grams and each n-gram from the set of n-grams of each n-gram representation from the set of n-gram representations is of a size different than a size of each n-gram from the set of n-grams of each remaining n-gram representation from the set of n-gram representations.

At 474, the feature extractor defines a feature vector based on the set of n-gram representations. For example, the processor can provide each n-gram from each n-gram representation as an input to a hash function to define the feature vector, as described with respect to FIG. 2. At 475, the feature extractor provides the input vector as an input to an input layer of a neural network (e.g., similar to neural network 112 and/or neural network 312 shown and described with respect to FIGS. 1 and 3, respectively) to produce an output.

At 476, the processor (e.g., using a maliciousness classifier similar to maliciousness classifier 113 shown and described with respect to FIG. 1) can compare the output of the output layer of the neural network with the known classification of maliciousness of the file and appropriately adjust the neural network. For example, the processor can train the neural network by appropriately adjusting weights based on the comparison. Several iterations of the method 400 can be carried out with different sets of features extracted from different files with a known maliciousness classification known such that results of comparison of output of the neural network and the known classification can be used to train the neural network. Training can be conducted using any suitable approach such as, for example, using a suitable back propagation method. At 477, the processor appropriately adjusts the neural network (e.g. to reduce error). The method 400 can then proceed back to 471 to iteratively adjust the neural network (e.g. to reduce error).

Figure 5:
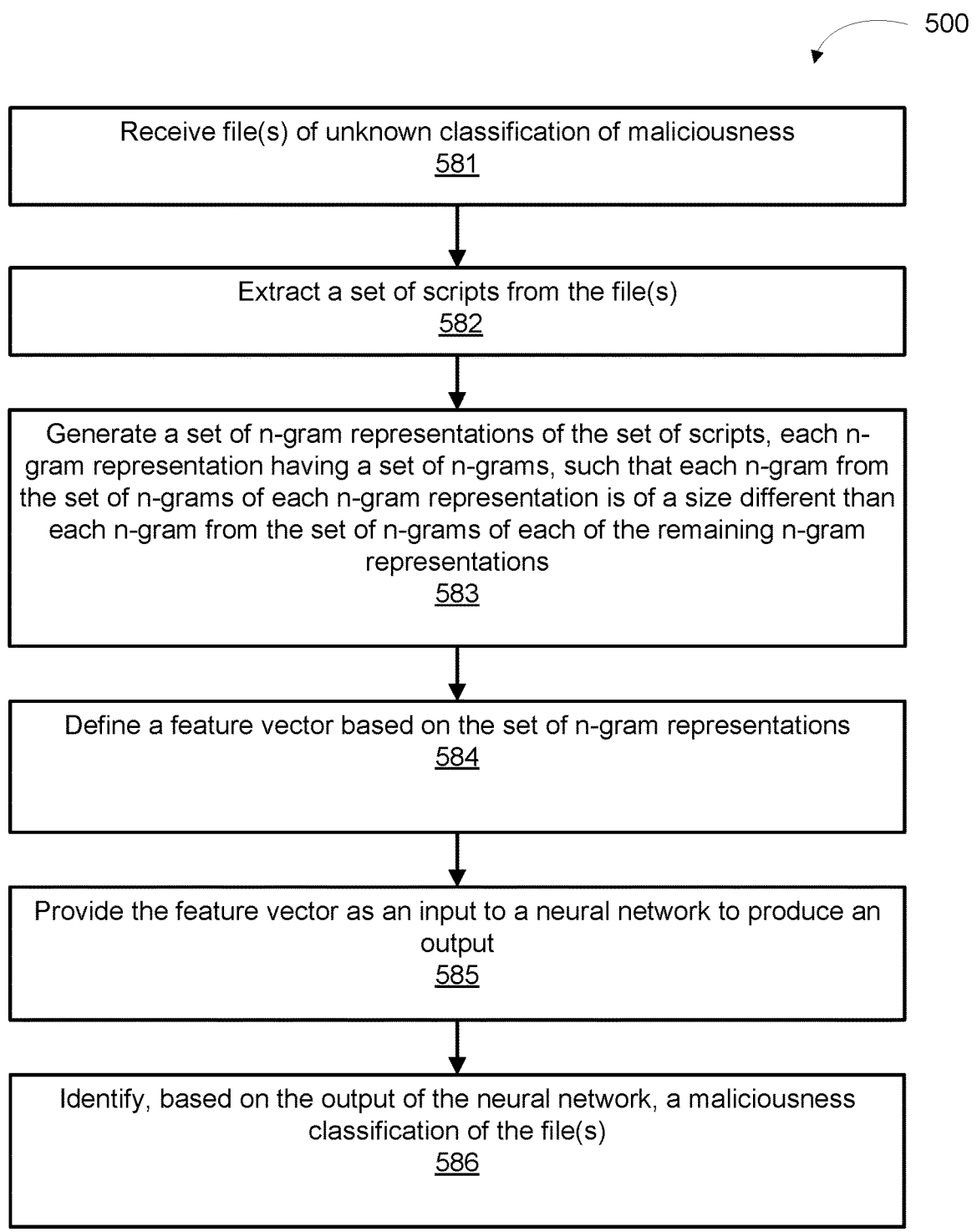
FIG. 5 is a flowchart illustrating a method for using a neural network to classify one or more files based on maliciousness by detecting associations in text indicative of obfuscated scripts, according to an embodiment.

FIG. 5 is a flowchart illustrating a method 500 for using a trained neural network (e.g., similar to the networks 112 and 312 shown and described with respect to FIGS. 1 and 3, respectively) within a maliciousness classification device, to classify an unknown file or data set, according to an embodiment. At 581, a processor (e.g., similar to the processor 110 shown and described with respect to FIG. 1) receives a file(s) with a classification of maliciousness that is unknown to the neural network.

At 582, a feature extractor (e.g., similar to the feature extractor 111 shown and described with respect to FIG. 1) extracts a set of scripts from the file. In some instances, strings associated with the set of scripts can be concatenated to define a script string.

At 583, the feature extractor generates a set of n-gram representations of the set of scripts (e.g., after defining a script string). Each n-gram representation from the set of n-gram representations has a set of n-grams and each n-gram from the set of n-grams of each n-gram representation from the set of n-gram representations is of a size different than a size of each n-gram from the set of n-grams of each remaining n-gram representation from the set of n-gram representations.

At 584, the feature extractor defines a feature vector based on the set of n-gram representations. For example, the feature extractor can provide each n-gram from each n-gram representation as an input to a hash function to define the feature vector, as described with respect to FIG. 2. At 585, the feature extractor can provide the input vector as an input to an input layer of a neural network (e.g., similar to neural network 112 and/or neural network 312 shown and described with respect to FIGS. 1 and 3, respectively) to produce an output. At 586, the processor can identify, based on the output, a maliciousness classification of the file. For example, a maliciousness classifier (e.g., the malicious classifier 113 shown in FIG. 1) can receive the output of the output layer of the neural network and classify the files(s) to produce a maliciousness classification.

While the examples provided above describe classification of maliciousness of a file, the disclosed devices and methods can be used for any kind of classification of any data such as image data, video data, voice data or text based data, numbers and counts based data and/or the like. For example, rather than and/or in addition to producing a maliciousness classification, the devices and methods disclosed herein can be used to classify images based on analysis of their content using one or more image characteristics that are captured. For example, the image characteristics can be color, gradient, smoothness, objects, object contours, etc. Based on analysis of the content using extracted characteristics the images can be classified as, for example, images of humans, animals, objects such as vehicles, weather patterns from radar outputs, etc. In other instances, the devices and methods described herein can be used to classify audio content, video content, text content, file type, and/or any other suitable events, objects, artifacts and/or data for any other suitable purpose, in addition to and/or instead of producing a maliciousness classification.

As an example, the maliciousness classification device 100 (shown and described with respect to FIG. 1) can be used to classify graphical content, such as, images, videos, graphs and/or the like. For example, the neural network 112 can classify images specific to and/or including animals (e.g., a dog, a cat and/or other types of animals), birds (e.g., a sparrow, a crow and/or other types of birds), vehicles, humans and/or the like. In other implementations, the maliciousness classification device 100 can be configured to classify any other type of data, files, images, and/or the like in any suitable manner.

The devices and methods described above can, in some implementations, be used to classify files using additional or supplemental information about the file in addition to the output of a neural network. For example, information about source of the file, an author associated with the file, the type of file, a history of the file, a length of the file, a date associated with the file, an extension associated with the file and/or the like can be used in combination with the output of a neural network to classify the file.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made.

Although various embodiments have been described as having particular features and/or combinations of components, other embodiments are possible having a combination of any features and/or components from any of embodiments as discussed above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

In this disclosure, references to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. The use of any and all examples, or exemplary language ("e.g.," "such as," "including," or the like) provided herein, is intended merely to better illuminate the embodiments and does not pose a limitation on the scope of the embodiments or the claims.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. An apparatus, comprising:
a memory; and
a processor operatively coupled to the memory, the processor configured to extract a set of scripts from a file, the processor configured to concatenate a representation of each script from the set of scripts with a representation of the remaining scripts from the set of scripts to define a script string,
the processor configured to extract a first n-gram representation from a plurality of n-gram representations from the script string, the first n-gram representation having a first set of n-grams, each n-gram from the first set of n-grams having a first size,
the processor configured to extract a second n-gram representation from the plurality of n-gram representations from the script string, the second n-gram representation having a second set of n-grams, each n-gram from the second set of n-grams having a second size different than the first size, and
the processor configured to define a feature vector based on the plurality of n-gram representations from the script string, the processor configured to provide the feature vector as an input to a neural network to produce an output, the processor configured to identify, based on the output, a maliciousness classification of the file.

2. The apparatus of claim 1, wherein the neural network includes no more than 128 inputs and at least 6 layers.

3. The apparatus of 1, wherein the processor is configured to define the feature vector by providing each n-gram from the first set of n-grams from the first n-gram representation from the plurality of n-gram representations of the script string as an input to a hash function.

4. The apparatus of claim 1, wherein the maliciousness classification of the file indicates whether the file is malicious or benign.

5. The apparatus of claim 1, wherein the maliciousness classification of the file classifies the file as a type of malware.

6. A non-transitory processor-readable medium storing code representing instructions to be executed by a processor, the instructions comprising code to cause the processor to:
extract a set of scripts from a file;
define a feature vector based on extracting a plurality of n-gram representations from the set of scripts, the plurality of n-gram representations including a first n-gram representation and a second n-gram representation, the first n-gram representation having a first set of n-grams, each n-gram from the first set of n-grams having a first size, and the second n-gram representation having a second set of n-grams, each n-gram from the second set of n-grams having a second size different than the first size;
provide the feature vector as an input to a neural network including no more than 128 inputs and at least 6 layers to produce an output; and
identify, based on the output, a maliciousness classification of the file.

7. The non-transitory processor-readable medium of claim 6, wherein the neural network detects an interaction between a script from the set of scripts and at least one other script from the set of scripts, the output being based at least in part on the interaction.

8. The non-transitory processor-readable medium of claim 6, wherein the code to cause the processor to define the feature vector includes code to cause the processor to provide each n-gram from each n-gram representation from the plurality of n-gram representations of the set of scripts as an input to a hash function.

9. The non-transitory processor-readable medium of claim 6, further comprising code to cause the processor to:
concatenate a representation of each script from the set of scripts with a representation of the remaining scripts from the set of scripts to define a script string, each n-gram representation from the plurality of n-gram representations of the set of scripts being a n-gram representation of the script string.

10. The non-transitory processor-readable medium of claim 6, wherein the code to cause the processor to identify a maliciousness classification of the file includes code to cause the processor to classify the file as a type of malware.

11. A method, comprising:
receiving a file;
extracting a set of scripts from the file;
generating a first n-gram representation from a plurality of n-gram representations of the set of scripts from the file, the first n-gram representation having a first set of n-grams, each n-gram from the first set of n-grams having a first size;
generating a second n-gram representation from the plurality of n-gram representations of the set of scripts from the file, the second n-gram representation having a second set of n-grams, each n-gram from the second set of n-grams having a second size different than the first size;
defining a feature vector based on the plurality of n-gram representations;
providing the feature vector as an input to a neural network to produce an output; and
identifying, based on the output, a maliciousness classification of the file.

12. The method of claim 11, further comprising:
concatenating a representation of each script from the set of scripts with a representation of the remaining scripts from the set of scripts to define a script string, the generating the first n-gram representation and the generating the second n-gram representation being based on the script string.

13. The method of claim 11, wherein the defining the feature vector based on the plurality of n-gram representations includes providing each n-gram from the first set of n-grams from the first n-gram representation from the plurality of n-gram representations of the set of scripts as an input to a hash function.

14. The method of claim 11, wherein a number of features in the feature vector is no more than 512.

15. The method of claim 11, wherein the neural network includes no more than 128 inputs and at least 6 layers.

16. The method of claim 11, wherein the identifying the maliciousness classification of the file includes classifying the file as a type of malware.

17. The method of claim 11, wherein the identifying the maliciousness classification of the file includes identifying the file as malicious or benign.

18. The method of claim 11, wherein the plurality of n-gram representations of the set of scripts from the file includes 3 gram, 4-gram and 5-gram representations of the set of scripts from the file.

19. The method of claim 11, wherein the defining the feature vector includes defining at least one feature in the feature vector by hashing a first n-gram, the first n-gram selected from the first n-gram representation from the plurality of n-gram representations and having the first size, and hashing a second n-gram, the second n-gram selected from the second n-gram representation from the plurality of n-gram representations and having the second size different from the first size.

20. The method of claim 11, wherein the providing includes providing the feature vector such that the neural network detects an interaction between a script from the set of scripts and at least one other script from the set of scripts, the output being based at least in part on the interaction.

21. A non-transitory processor-readable medium storing code representing instructions to be executed by a processor, the instructions comprising code to cause the processor to:
extract a set of scripts from a file;
define a feature vector based on the set of scripts;
provide the feature vector as an input to a neural network such that the neural network detects an interaction between a script from the set of scripts and at least one other script from the set of scripts;
receive an output from the neural network, the output being based at least in part on the interaction; and
identify, based on the output, a maliciousness classification of the file.

* * * * *